Dec. 11, 1956 J. A. DICKIE 2,773,482
FLUID-OPERATED VIBRATION TEST EXCITER
Filed July 21, 1954 13 Sheets-Sheet 1

Inventor
John A. Dickie
By his attorneys
Howson and Howson

Dec. 11, 1956  J. A. DICKIE  2,773,482
FLUID-OPERATED VIBRATION TEST EXCITER
Filed July 21, 1954  13 Sheets-Sheet 2
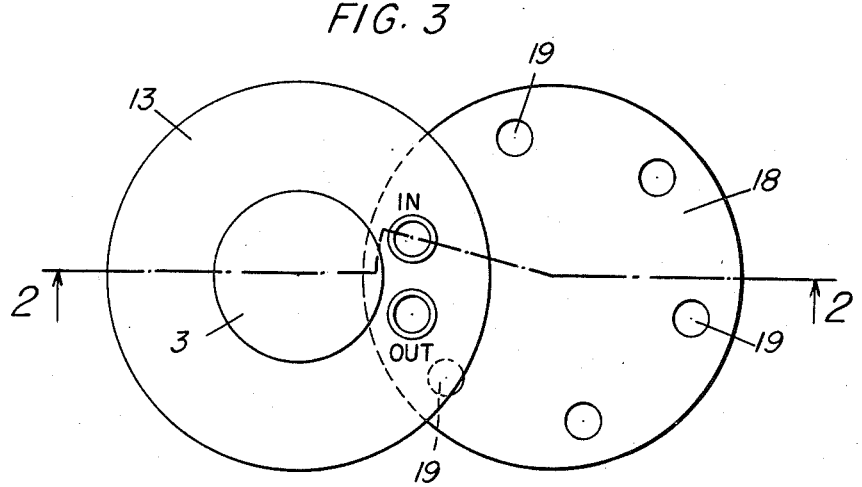
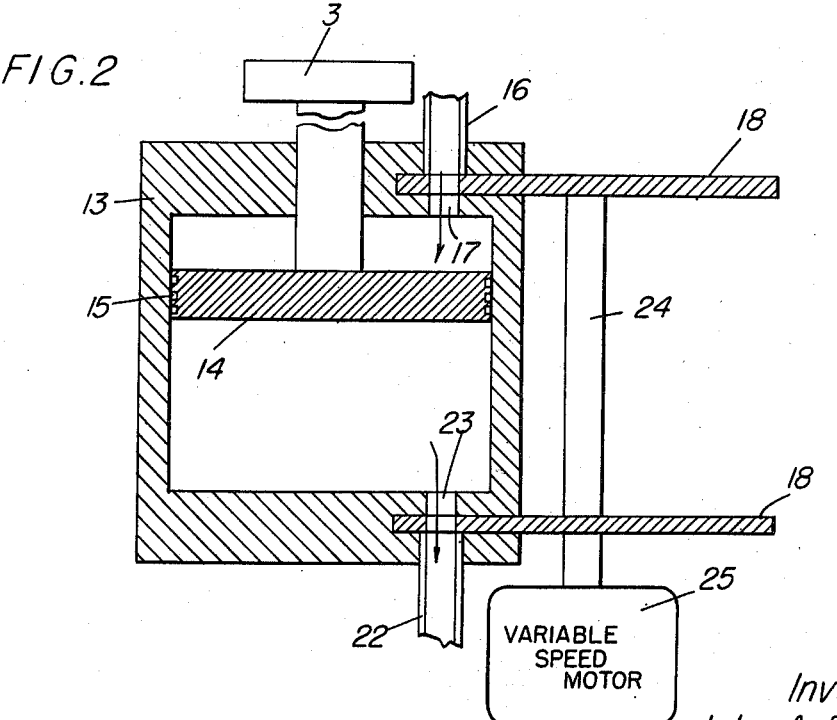
Inventor
John A. Dickie
By his attorneys
Howson and Howson

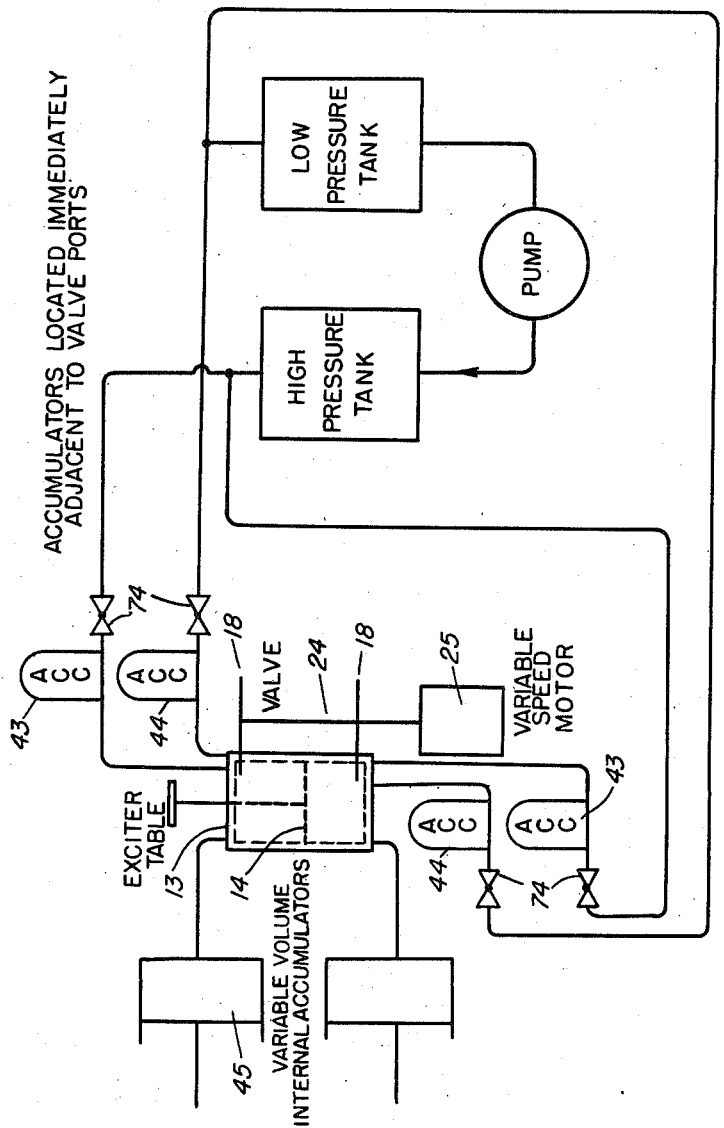

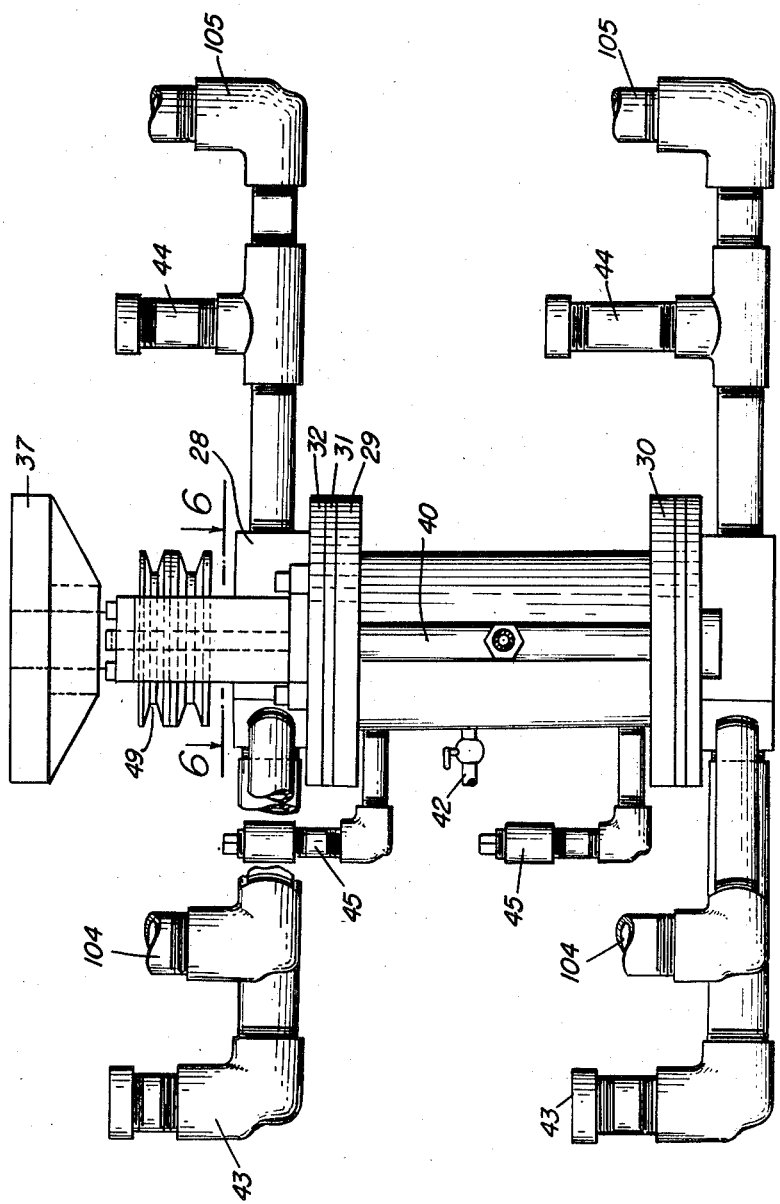

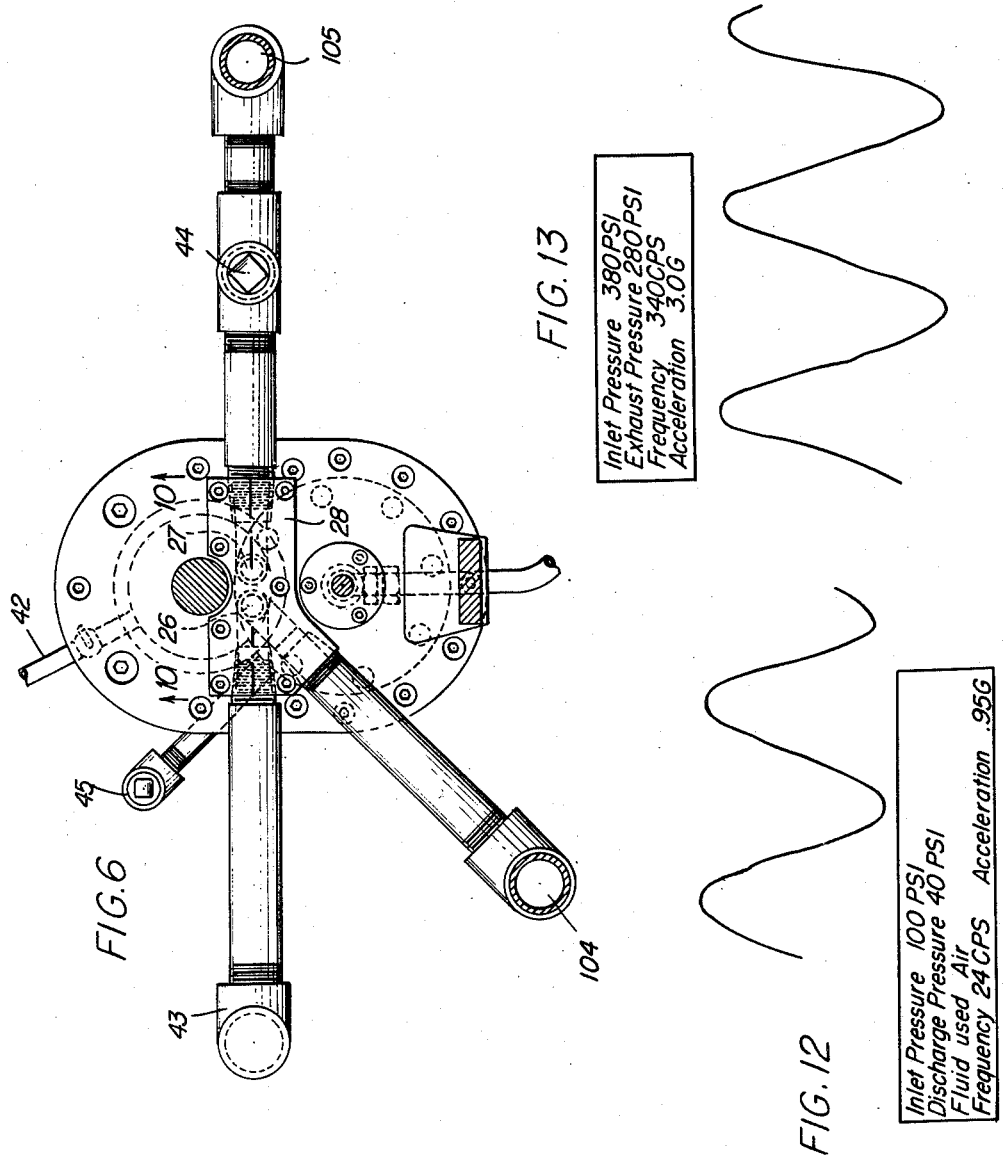

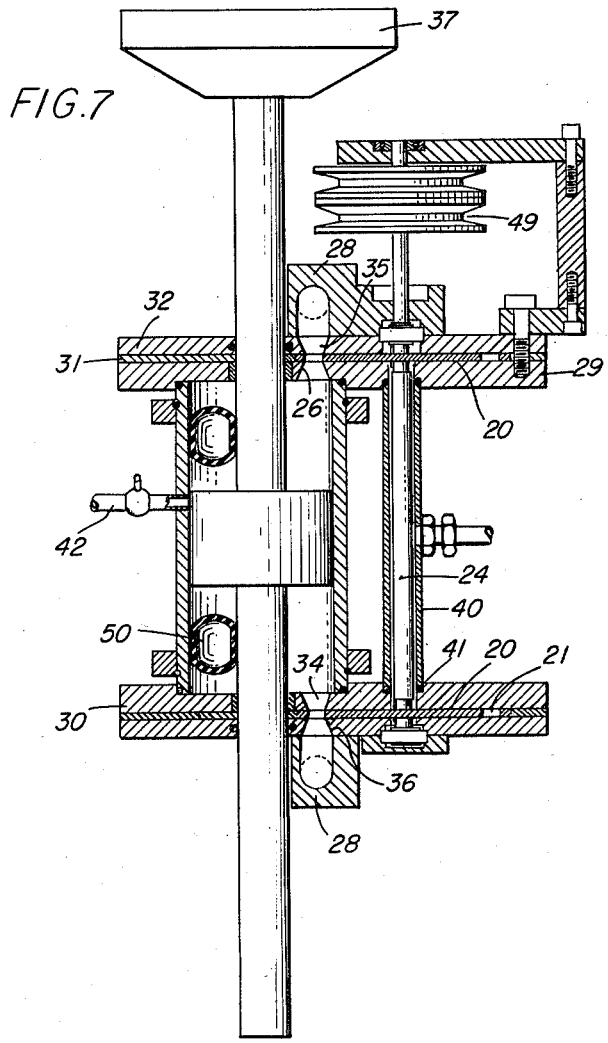

Dec. 11, 1956  J. A. DICKIE  2,773,482
FLUID-OPERATED VIBRATION TEST EXCITER
Filed July 21, 1954  13 Sheets-Sheet 7
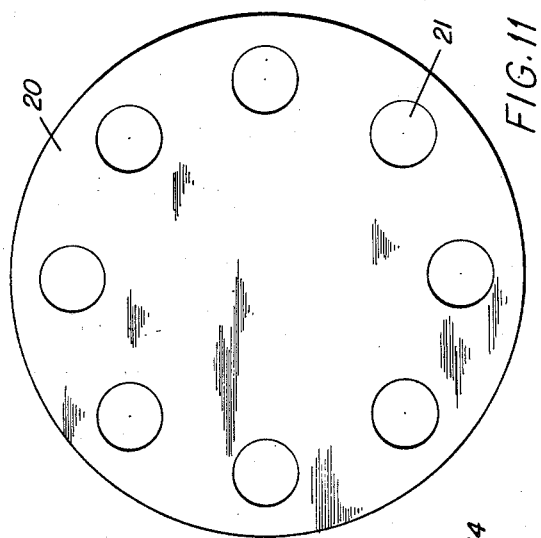
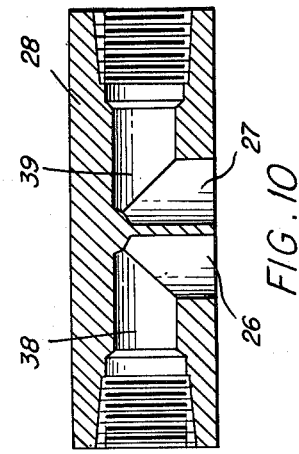
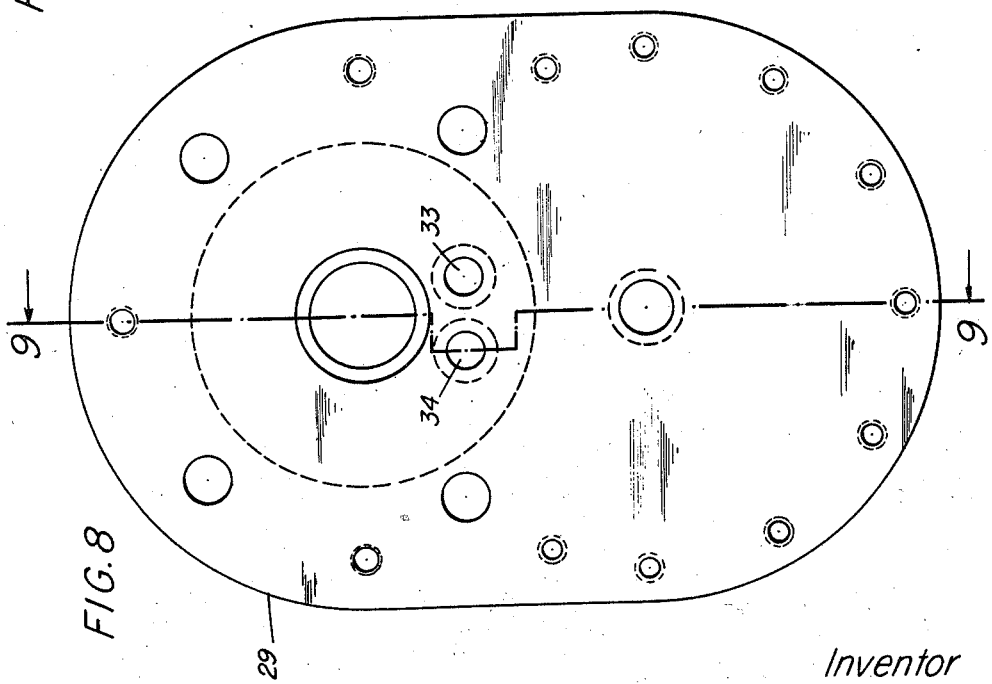
Inventor
John A. Dickie
By his attorneys
Howson and Howson

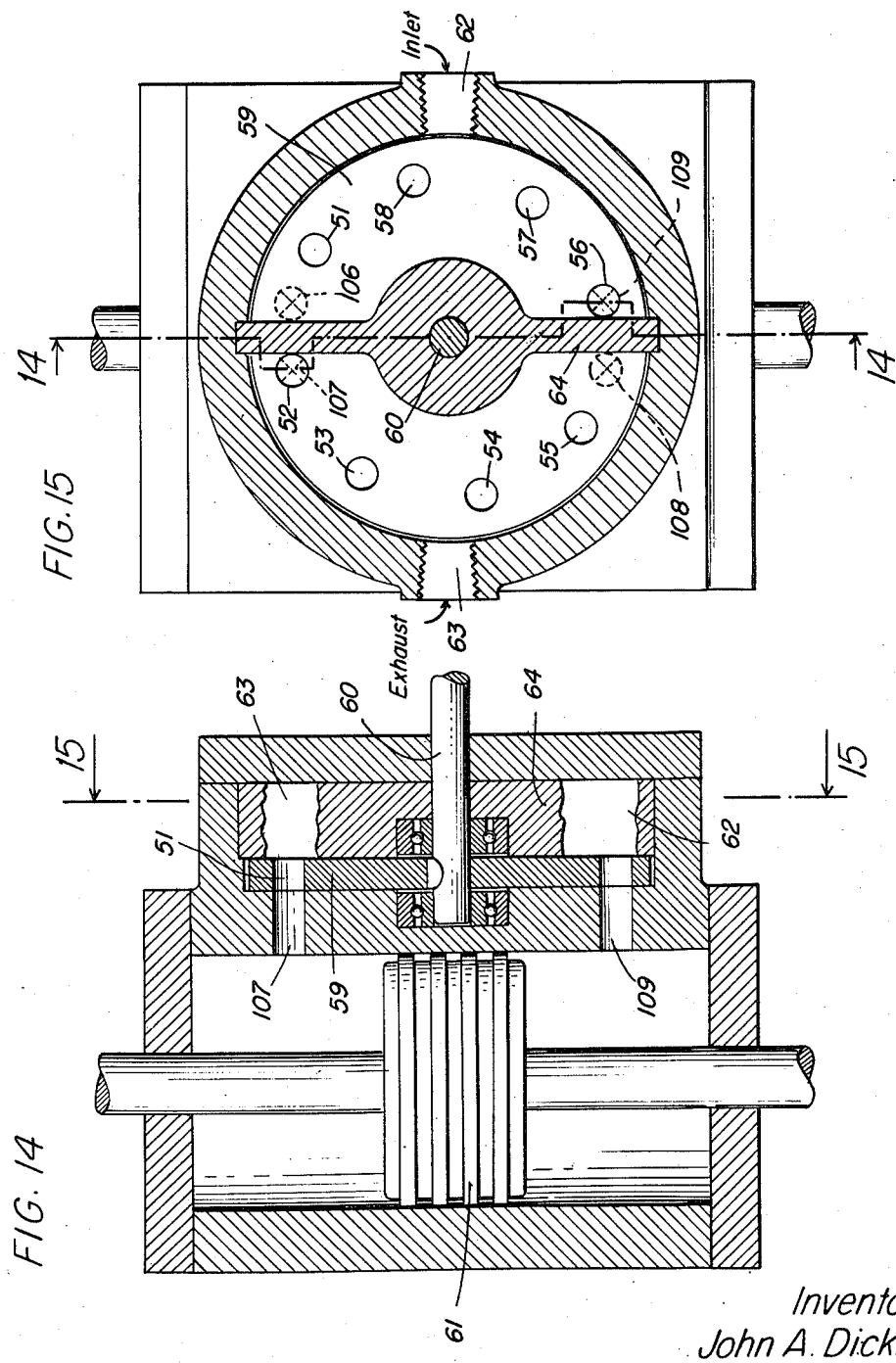

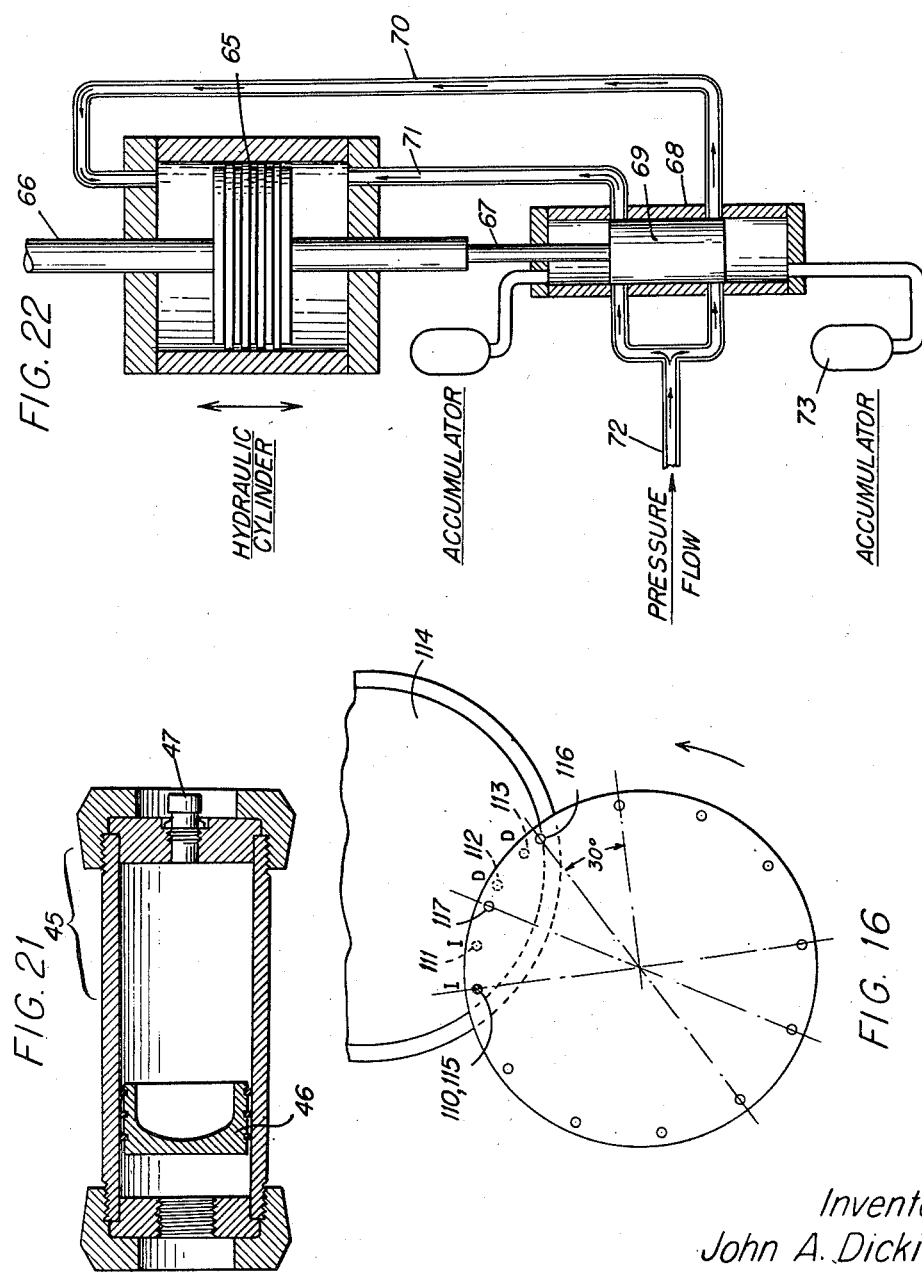

Dec. 11, 1956   J. A. DICKIE   2,773,482
FLUID-OPERATED VIBRATION TEST EXCITER
Filed July 21, 1954   13 Sheets-Sheet 10
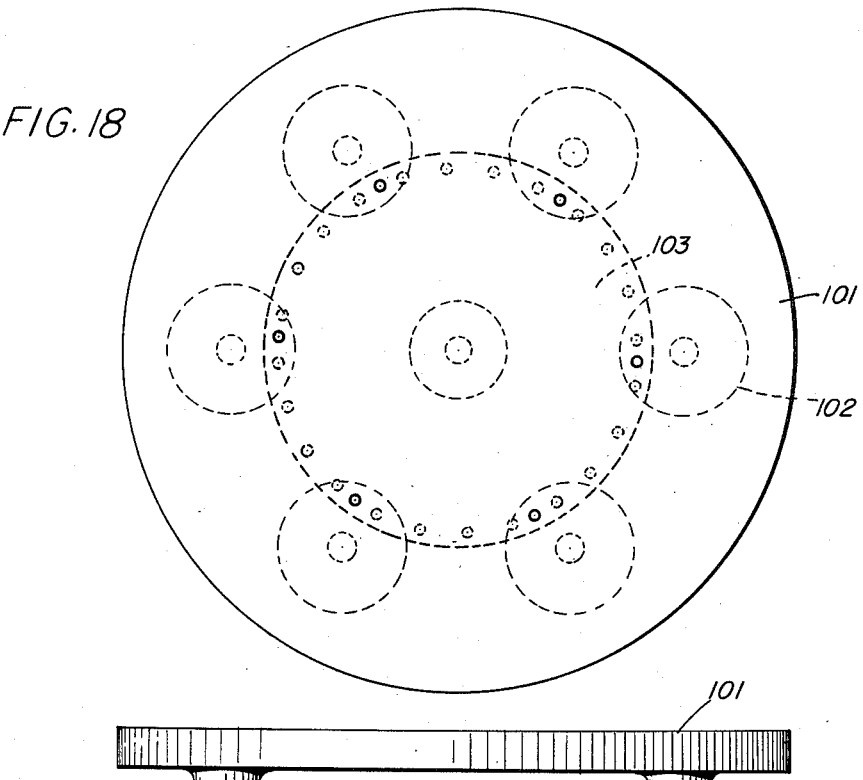
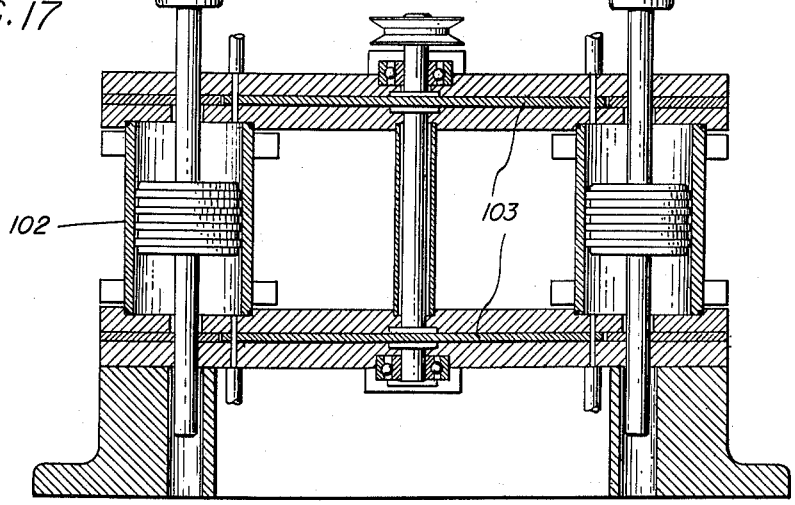
Inventor
John A. Dickie
By his attorneys
Howson and Howson Dec. 11, 1956  J. A. DICKIE  2,773,482
FLUID-OPERATED VIBRATION TEST EXCITER
Filed July 21, 1954  13 Sheets-Sheet 11
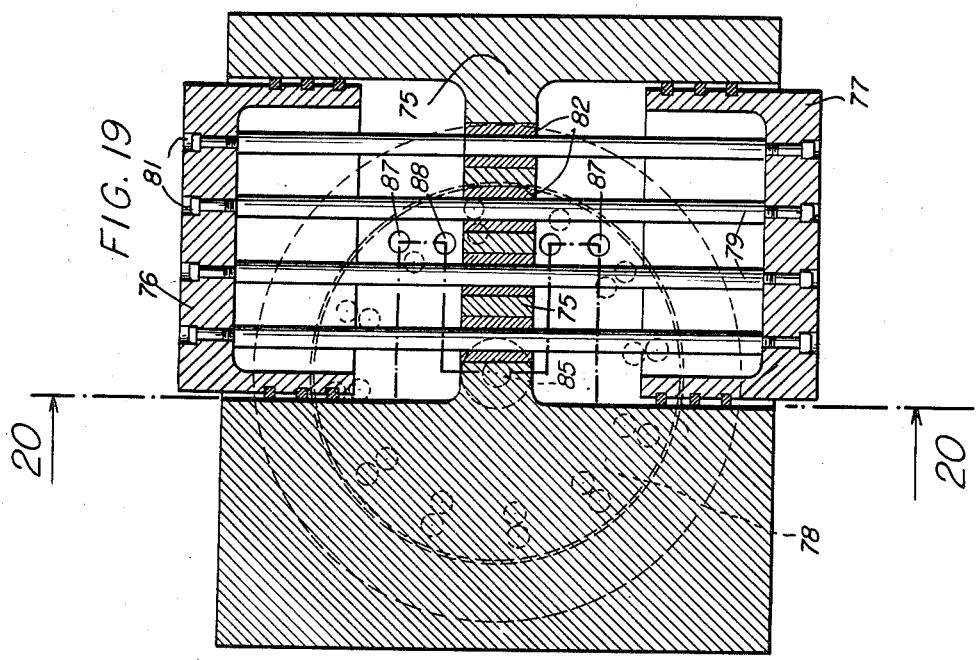
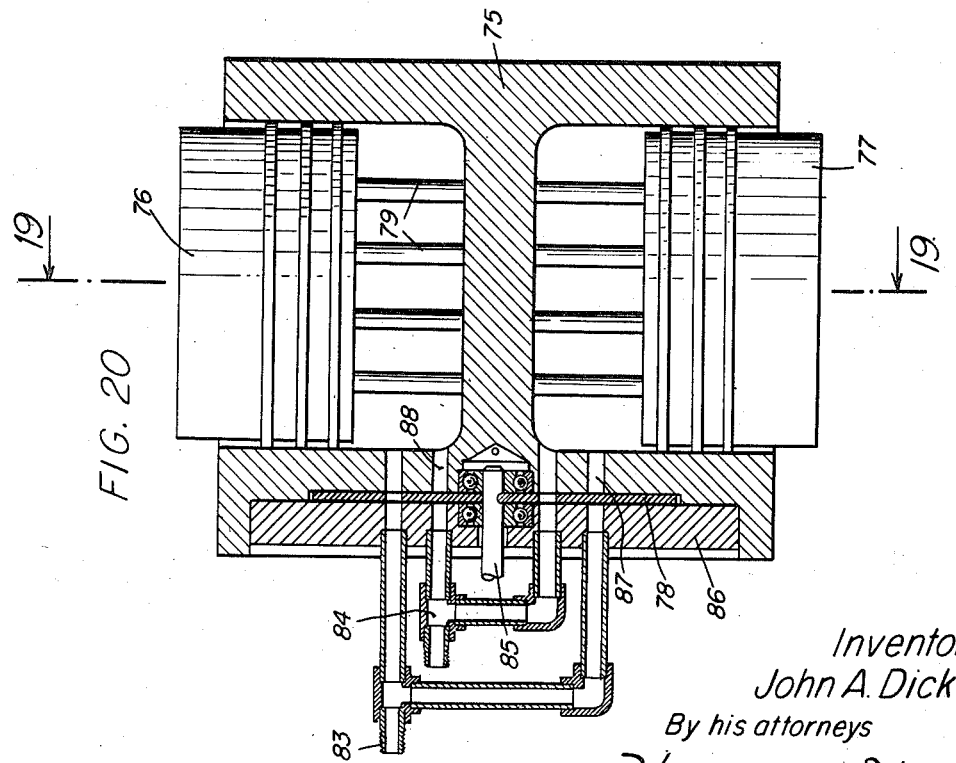
Inventor
John A. Dickie
By his attorneys
Howson and Howson

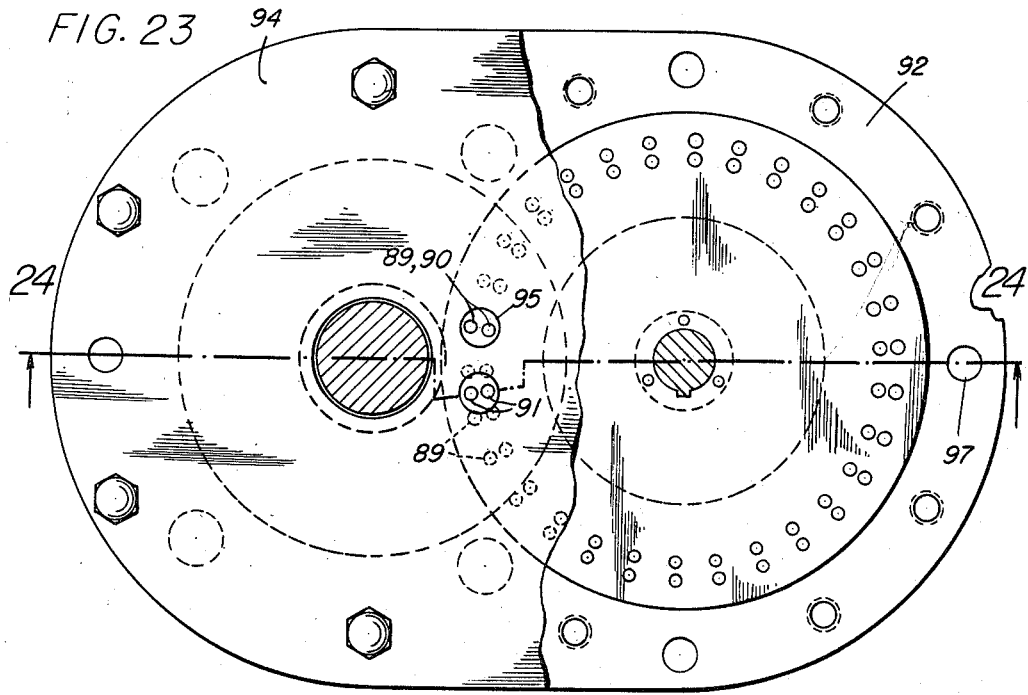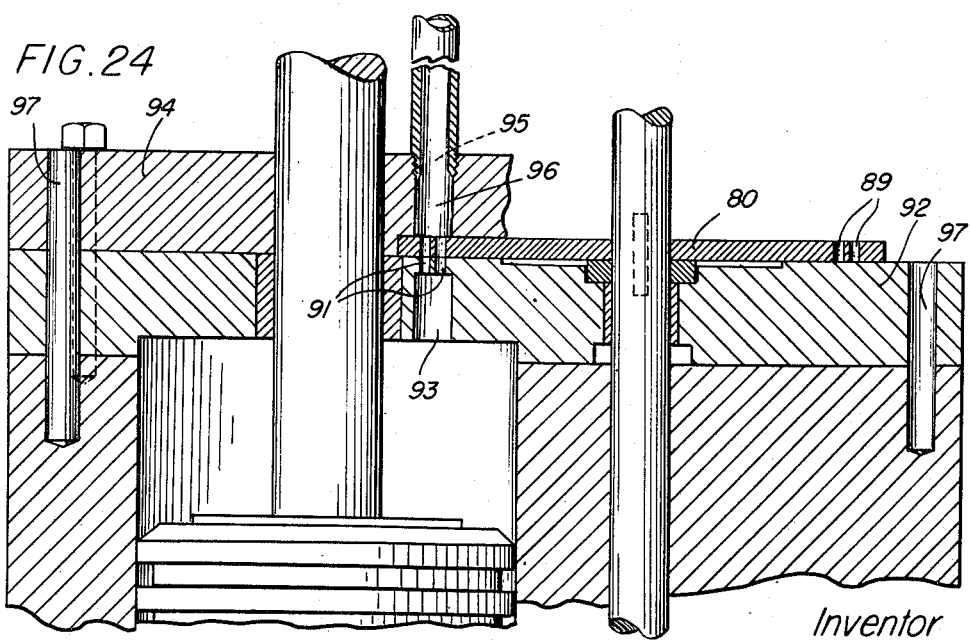

Dec. 11, 1956  J. A. DICKIE  2,773,482
FLUID-OPERATED VIBRATION TEST EXCITER
Filed July 21, 1954  13 Sheets-Sheet 13

Inventor
John A. Dickie
By his attorneys

Howson and Howson

United States Patent Office 2,773,482
Patented Dec. 11, 1956

2,773,482
FLUID-OPERATED VIBRATION TEST EXCITER

John A. Dickie, Hamden, Conn., assignor, by mesne assignments, to Textron Inc., a corporation of Rhode Island Application July 21, 1954, Serial No. 444,842

16 Claims. (Cl. 121—20)

This invention relates to fluid-operated vibration test exciters adapted more particularly to operate at high frequencies with high force generation.

Vibration testing of machines and structures to check their dynamic behavior and their resistance to fatigue is now an accepted practice in industry. Vibration test equipment is ordinarily driven electromagnetically. Such machines are very suitable for testing small objects at high rates of vibration. However, these machines are relatively expensive and therefore unavailable for many uses, even where only a relatively low force is desired. Furthermore, there is a field of high force geeration which the electromagnetic equipment cannot conveniently fill. Heretofore hydraulic equipment has not had the simplicity nor the ability necessary for this work. No one prior to the present invention has been able to devise practical fluid-operated equipment which can produce the desired characters of movement and frequency. One of the objects of my invention is to produce a vibration exciter which is comparatively simple and inexpensive and which can generate very high force potential at relatively high frequencies. The vibration exciter of my present invention is preferably fluid operated, i. e. it may be operated by means of a suitable pressure liquid or by means of a suitable gaseous pressure medium. It is characteristic of this fluid-operated vibration test exciter that it involves a construction in which there is provided a very short path for the driving fluid, which fluid has to be accelerated and stopped at very opening and closing movement of the valves, of the operating mechanism. Further, this exciter has valving mechanism which can produce sinusoidal opening and closing of the ports and therefore movement of the test table under conditions which may be varied to suit practically all the needs of the test vibration exciter field. It also has independent control of frequency and force. In this way this exciter can control not only the frequency of the oscillations but also the force or the displacement or the velocity of the moving element.

One of the great difficulties in driving a vibration exciter hydraulically or pneumatically at the proper speed and pressure is the selection and proper utilization of valving mechanism and associated parts. An exciter made in accordance with my present invention may include a perforated member or members of sheet-like material, for example, one or more rotary valve disks or one or more perforated endless belt-like members, which may be incorporated directly in or close to the driving cylinder to control the inlet and exhaust of the fluid to and from said cylinder. Each disk has two or more circumferentially-spaced holes, and the connections associated with the disks permit control of the flow of the operating fluid to and from both sides of the piston which operates the table carrying the test specimen.

In the drawings:

Fig. 2 is a simplified view partly in vertical section through the valves of a two disk embodiment of an exciter according to my invention, taken on the line 2—2 of Fig. 3, showing the inlet port open at the top of the cylinder and the discharge port open at the bottom of the cylinder.

Fig. 3 is a diagrammatic plan view of the exciter of Fig. 2 showing the relation of the inlet and discharge openings at the top disk openigs.

Fig. 4 is a diagrammatic arrangement of the various units of an exciter made in accordance with my invention to illustrate some of the functional relations of the parts to the valve system.

Fig. 5 is a view in eelvation of an hydraulic piston exciter according to my invention.

Fig. 6 is a plan view of the exciter of Fig. 5, omitting the driving pulley.

Fig. 7 is a view in vertical section on the median line through the cylinder of the exciter of Fig. 5 in a manner similar to Figs. 2 and 3 but with a different type of internal accumulator.

Fig. 8 is a plan view of the inner top head of the valve mechanism of the exciter of Figs. 5, 6 and 7.

Fig. 9 is a view in vertical section through the inner head of Fig. 8, taken on the line 9—9 of Fig. 8.

Fig. 10 is a view in longitudinal vertical section through the upper valve port block of Fig. 6, taken on the line 10—10 of Fig. 6.

Fig. 11 is a plan view of a form of valve disk according to my invention and showing a form of valve disk provided with eight circumferentially-spaced openings, such a form of valve disk being particularly adapted for use in that form of my invention shown in Figs. 5 through 10 of the accompanying drawings.

Fig. 12 is a test representation of a typical acceleration sine curve wave (acceleration plotted against time) produced by a pneumatic embodiment of my invention.

Fig. 13 is a similar curve of an hydraulic embodiment of my invention.

Fig. 14 is a view in vertical section through the cylinder of an hydraulic exciter according to my invention in which a single valve disk tangent to the wall of the cylinder is used for valving on both sides of the piston, the view being taken on the line 14—14 of Fig. 15.

Fig. 15 is a sectional view in elevation taken through the valving mechanism of the single disk embodiment of Fig. 14, at right angles to Fig. 14 and on the line 15—15 of that figure.

Fig. 16 is a diagrammatic plan view of part of one end of the cylinder and one disk of a modified two-disk embodiment of the invention in which there are two inlet and two discharge ports in each end of the cylinder, the ports at an end all operating at separate times.

Fig. 17 is a view in elevation, partly in section, through the center of an embodiment of my invention in which there are a number of cylinders arranged to be operated by a single pair of valve disks.

Fig. 18 is a plan view of the embodiment of Fig. 17.

Fig. 19 is a view in vertical section through the center line of the cylinder in a plane parallel to the valve disk of a double piston, single valve disk embodiment of my invention, taken on the line 19—19 of Fig. 20.

Fig. 20 is a view in vertical section, in a plane normal to the valve disk at the side of the cylinder, of the embodiment of Fig. 19, showing the valve ports.

Fig. 21 is a longitudinal section through an adjustable volume accumulator for an hydraulic embodiment of my invention.

Fig. 22 is a view in vertical section through the cylinder of an hydraulic piston embodiment of my invention, showing hydraulic mechanism for centering the piston.

Fig. 23 is a plan view of a high frequency exciter with pairs of radially arranged holes for high frequency operation of a two-disk exciter according to my invention.

Fig. 24 is a view in vertical section of one of the high frequency disks of Fig. 23 and the associated inlet and outlet ports.

Figure 25:
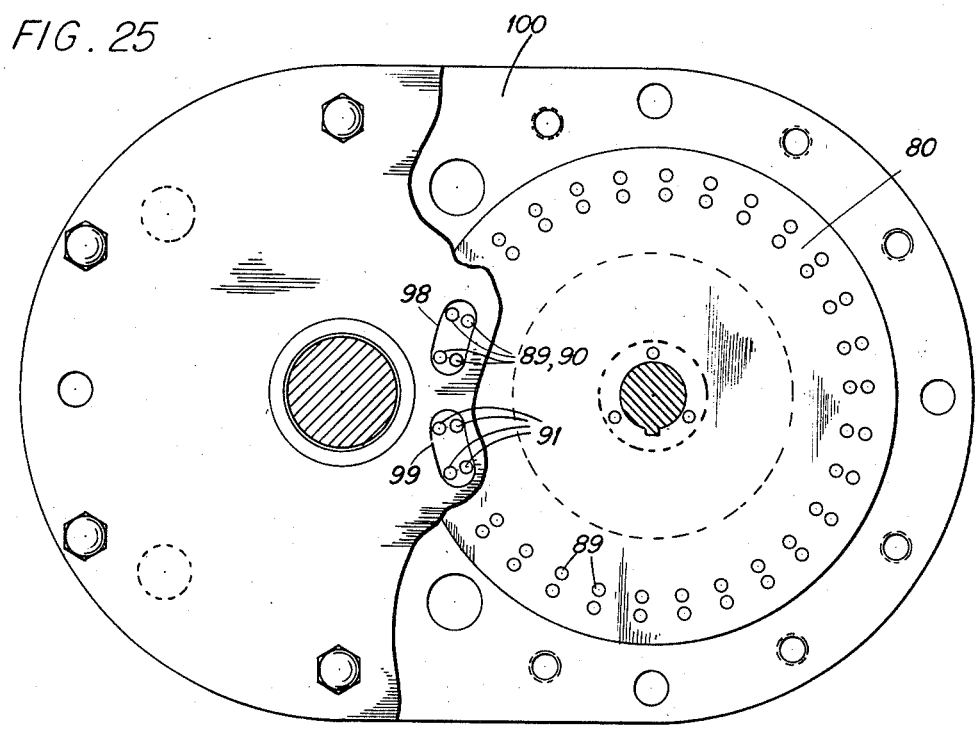
Fig. 25 is a plan view of a modification of the exciter of Fig. 23 in which two pairs of radial holes in the disk are used simultaneously to give increased port capacity in high frequency operation.
Figures 26, 27, 28:
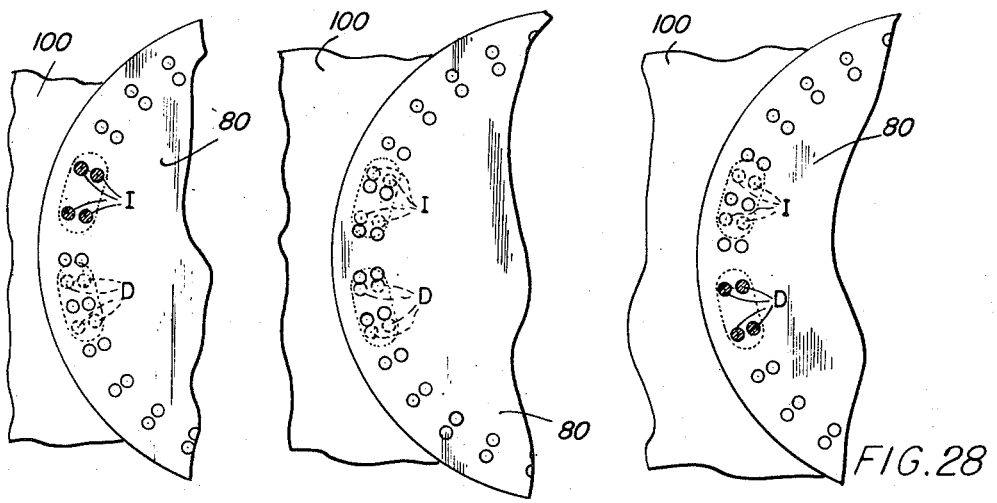

Figs. 26, 27 and 28 are schematic diagrams illustrating the spacing and interaction of the disk holes and the ports in the inner heads in the modification of high frequency operation in Fig. 25; Fig. 26 showing the position of the parts while a valve disk is permitting inlet, Fig. 27 after the inlet has been cut off, and Fig. 28 during discharge at the end of the cylinder where the disk is located.

Figure 1:
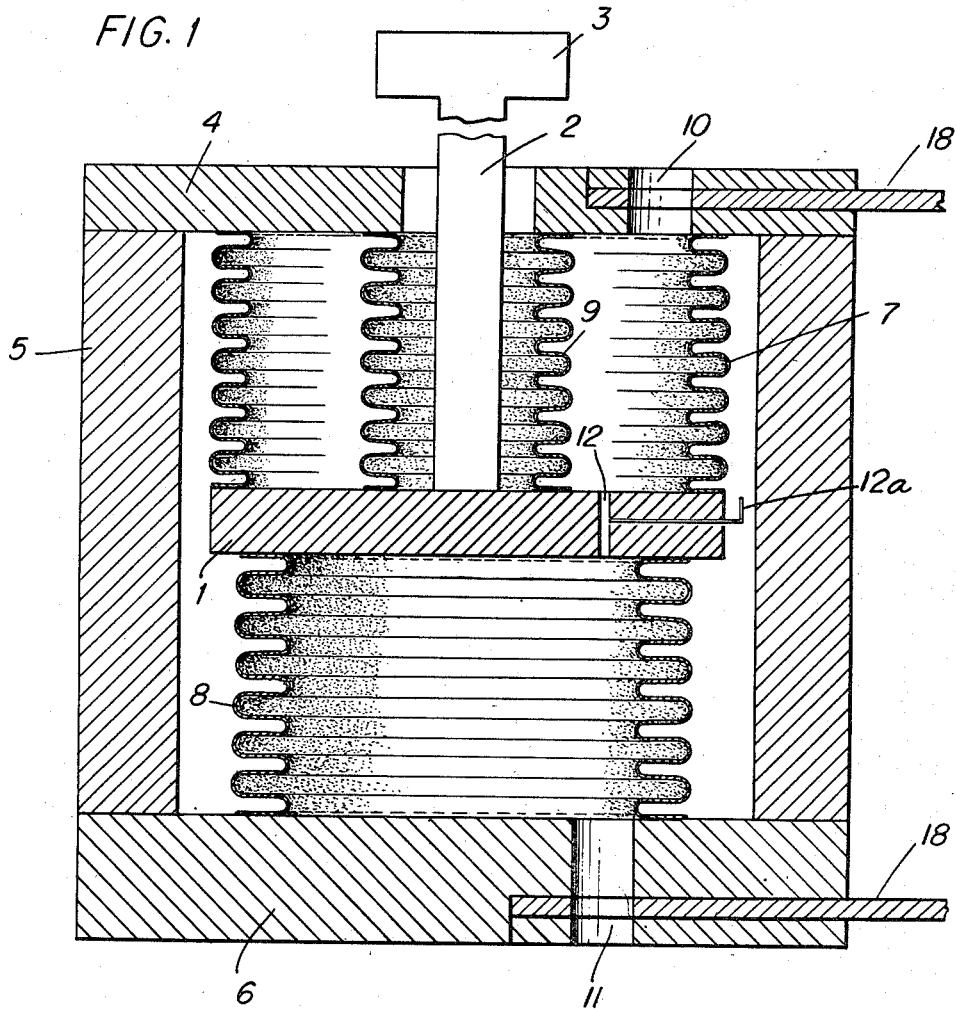
Fig. 1 is a schematic view in vertical section through a Sylphon bellows type of cylinder adapted to be used as part of an exciter embodying my invention.

A vibration test exciter when driven by fluid, e. g. a pneumatic, hydraulic, or steam driven exciter, may be of several types. If it is desired to avoid friction in moving parts, one can use the type shown in Fig. 1 where Sylphon bellows are employed. The construction shown includes a driver plate or piston 1. To the piston is attached a driver rod 2 lying longitudinally in the cylinder. This rod extends upwardly from the plate 1 and carries a table 3 on its upper end. The specimen to be tested, of course, will be fastened onto the table 3. The piston 1 can be located in an enclosure, i. e. cylinder, comprising a thick metal top 4, a cylindrical frame 5 and a thick base 6. Connecting the piston 1 to the top 4 is an outer Sylphon metal bellows 7 and a similar inner bellows 9. The piston 1 is connected to the base 6 by a bellows 8 which encloses a space of practically the same size as the space enclosed by the outer upper bellows 7, minus the size of the space within upper inner bellows 9. There is a fluid connection 10 through the top 4 to the space between the two upper bellows 7 and 9, and a corresponding fluid connection 11 through the base 6 to the space inside the lower bellows 8. I prefer to provide an orifice 12 through the piston 1 connecting the space below the piston 1 with the space between the two upper bellows 7 and 9 to assist in the obtaining of a sinusoidal motion curve for the table 3. A hand-manipulated movable shutter 12a is provided to adjust the size of the orifice 12. This orifice produces a result similar to that produced by the leakage of fluid past a conventional piston wherein such leakage is determined by the basic clearance and ring arrangement between a conventional cylinder and piston. The connections to the valve ports 10 and 11 are controlled by rotary disks 18, as will be explained in more detail in connection with Figs. 2 and 3. It will be noted that by providing the inner bellows 9, the necessity for stuffing boxes is avoided. While I have shown two bellows on one face of the piston and one on the other for purposes of illustration, it should be understood that the same effective arrangement could be provided on the two faces, i. e., two bellows on each side or one bellows on each side. The effective pressure areas are similar for motion in each direction.

As already mentioned, the Sylphon bellows piston type of construction avoids friction in the moving parts but where some friction can be tolerated, a straight hydraulic piston type of drive may be used. An example of a straight piston construction is shown in simplified form in Figs. 2 and 3, as far as concerns the valves and piston. It will be observed here that I have shown the hydraulic cylinder as a block 13 and that the piston 14 has the conventional packing rings 15. Where minimum friction is desired, particularly when the machine is to be used in the higher frequency ranges with corresponding shorter strokes, the entire moving element assembly can be guided by flexures of the type used in electromagnetic vibration exciters. These may be either inside or outside of the hydraulic cylinder.

My fluid exciter requires alternating pressure and release of pressure fluid at opposite sides of the piston in continuous succession and without "dwell." There are many valving mechanisms used on air, hydraulic and stream applications in industry but they vary greatly according to the specific application for which the mechanism is employed. A great many of such devices include fixed displacement mechanism and, hence, such devices do not fill the basic requirements of vibration exciters. The requirements of this field are exceptional. The fact is that none of the mechanisms heretofore known seem to fit the specific requirements of the vibration exciter field, particularly in the high frequency range.

The vibration exciter field desires control not only of the frequency of oscillation but also the force or the displacement or the velocity of the moving element. These conditions must be accurately maintained and also accurately varied. In addition, in many applications in vibration exciter fields, a sinusoidal motion of the moving element is desired. There are additional requirements in the vibration exciter field which require special consideration, such, for instance, the possibility of carrying a fixed gravity load on the test table.

I have found that all the basic requirements of the vibration exciter field can be obtained, including the development of a sinusoidal motion, by a valve mechanism such as I have devised to control the flow at each end of the cylinder. Referring to the general diagrams of Figs. 2, 3 and 4, I have shown a supply port 16 directly opposite a cylinder port 17 at one end of the exciter cylinder 13. Between this high pressure supply port 16 and the port 17 in the cylinder 13 is a light disk 18 having two or more circumferentially spaced holes 19. In this embodiment, I provide an upper disk 18 and a lower disk 18, one being at the top of the cylinder 13 and one at the bottom thereof. The disk 18 at the bottom of cylinder 13 is shown associated with a supply port 22 and a cylinder port 23 at the lower end of the exciter cylinder 13. This lower disk 18 has formed therein a series of circumferentially-spaced holes 19 arranged in the same manner as the holes in the upper disk 18. In the example shown in Fig. 3, there is a total of six holes 19 arranged at equal intervals around the face of the disk near the periphery thereof. Of course, there is both an inlet and an outlet supply port and similar cylinder ports at each end of the cylinder. The two disks 18 are carried on a shaft 24 extending vertically along the outside of the hydraulic cylinder 13, which shaft is driven by a variable speed motor 25. A suitable speed control mechanism can be provided to vary the rotational speed of the valve disks 18 and thereby the frequency of the piston movements.

Fig. 2 is intended as being taken on section line 2—2 of Fig. 3 and that section line is shown passing through a supply port marked "In" in Fig. 3. Similarly, I have shown an arrow in Fig. 2 entering the upper half of the cylinder 13 through the port 16. The upper end of the cylinder 13 is, of course, the inlet port. A hole 19 in the rotary disk 18 is shown in register with this supply port 16. The high preessure tank of Fig. 4 therefore is in communication with the space above the piston 14 in cylinder 13, and the arrow in Fig. 2 shows the fluid entering said cylinder to push the piston 14 downwardly within the cylinder 13.

At the bottom of the cylinder 13 in Fig. 2, I have shown an arrow indicating that the fluid below the piston 1 is going out through the cylinder discharge port 23, one of the holes 19 in the lower disks 18 and the outlet port 22. The inlet and outlet ports at the bottom of the cylinder can thus be phased with relation to the ports at the top of the cylinder. If preferred, of course, the holes in the top and bottom disks can be staggered circumferentially with relation to each other so that a hole in the bottom disk is in register with the discharge port at the lower end of the cylinder when a hole in the upper disk is in line with the inlet port at the top of the cylinder.

I will now describe the details of the valving mechanism of the specific embodiment of Figs. 5 to 11, beginning with the openings 21 in the disk 20 (Fig. 11). Each disk 20 provides the valving for one end of the cylinder. The external connections to the inlet and discharge ports 26, 27 (Fig. 6) are shown directly on the cylinder heads. The phase relationship of the two ends of the cylinder is controlled by the relative angular location of the valve holes 21 in the two disks 20. (The phase relationship can, in the alternative, be controlled by the location of the inlet and discharge ports at the two ends of the cylinder.) At each end of the cylinder there are two openings in a valve port block 28, one leading to the high pressure side and one to the low pressure side of the closed high and low pressure system. This system forms a fluid supply and return system. The spacing of these high and low presure holes in the port block 28 is such that a hole 21 in the disk 20 approximately spans or slightly overlaps the distance between the pressure and discharge ports in the valve port block 28.

In Fig. 11 the disk 20 is shown with eight holes 21. The diameter of each hole or port 21 extends approximately 11¼° around the face of the disk 20 near the periphery thereof. The diameter of these eight holes 21 and the spacing at which they are located are proportioned to give exactly the proper phase relationship of circumferential diameters and timing so that one hole 21 in a disk 20 is just beginning to open as another becomes closed. Both pressure and discharge mating parts have valve ports of similar diameter located 22½° apart so that their extremities are approximately 11¼° apart, thus allowing each hole 21 in the valve disk 20 to approximately span the distance between the inlet and discharge ports in the cylinder head assembly. It will be seen that 45° of rotation of the valve disk 20 will sweep the pressure supply port for piston motion in one direction, then the discharge port for the piston motion in the opposite direction. In other words, there is one complete cycle of the piston for each 45° of rotation. Therefore one complete revolution of the pair of disks 20 shown in Fig. 11 will produce eight complete cycles of the piston in the cylinder of Fig. 7. The disk 20 at the opposite end of the cylinder is timed to work oppositely so that when the first end of the cylinder is at inlet or high pressure, the second end will be at discharge or low pressure. When the second end has changed to high pressure, the first end will have changed to low pressure. If the number of holes 21 in the valve disks 20 is altered, the same ratio of port size to degree of rotation should be substantially maintained. For instance, if there were only six holes, as in the disk 18 of Fig. 3, there would be six complete cycles of the piston for one revolution of the driving disk. If there were twelve holes 21 there would be twelve cycles, etc. The disks 21 are driven by the pulley 49 which can receive its power from a variable speed motor, as in the case of Fig. 2.

While I have shown the shapes of the ports in the disks as circular, their shape can be varied as needed to produce the required wave pattern. As the frequencies which the machine is desired to produce are increased, a point will be reached at which the driving speed of the rotating valve disks becomes excessive. In this case, a second valving mechanism may be used on the same cylinder which will be similar in phase relationship of the adjacent ports to the first mechanism but will have smaller openings in a correspondingly increased number of ports with corresponding reduction in angular span. This increase in the number of ports can be accomplished either by adding additional ports to the valve port block and the inner head of the cylinder or by increasing the number of holes in the valve disk, as already described in connection with the first valving mechanism. Inlet and discharge ports with their corresponding ports in the valve disk can also be at two distinct radii from the center of rotation of the valve disk, as shown in Figs. 19 and 20. The location of the rotating valve disk as close as possible to the cylinder is designed to keep the effective length of the pulsating fluid path as short as possible. My design provides the shortest possible path between the external accumulators, hereinafter described, so that the required fluid is driven through the ports at high speed during the opening and closing time cycle.

It is to be pointed out that while in this arrangement, the ends of the cylinder which engage opposite sides of the valve disks have ports therein having diameters similar to the diameters of the ports in the valve disk, the ports in the said ends of the cylinder on one side or the other or on both sides of the valve disks may be greatly enlarged to reduce the velocity of the fluid passing therethrough and corresponding pressure loss (see Figs. 7, 9 and 24). Using a minimum thickness of valve disk, the port of larger diameter will be on the high pressure side of the valve disk, so that the disk will be pushed against the working port. In other words, the pressure simply would lead to the valve disk through a port of relatively large diameter, while the pressure entrance through the port in the valve disk to the cylinder would be through a port of designed diameter, either smaller or greater than the diameter of the port in the valve disk. The discharge from the cylinder to the valve disk would be through a port of relatively large diameter as compared to the diameter of the ports in the valve disk, while the discharge port from the cylinder to its accumulator and piping would be of designed diameter, either smaller or greater than the diameter of the port in the valve disk. However, in the case of the inlet and discharge ports being at the minimum angular spacing, the space between the two must not allow short-circuiting of the driving medium by such openings.

Turning now to the cylinder, it is closed off at each end by an inner head 29 at the top and an inner head 30 at the base (see Figs. 7, 8 and 9). Spaced outside these inner heads 29 and 30 by spacer plates 31 are outer heads 32. Each inner head 29, 30 has two openings 33, 34 in its adapted to act as supply ports into and from the cylinder respectively. The location of these two holes with relation to each other can be seen diagrammatically in Figs. 3 and 6, as well as in Fig. 8.

Each outer head 32 has a port 35, 36 in register with the inlet port 33 and the outlet port 34, respectively, of the inner heads 29, 30. These are tapered in the opposite direction from the ports in the inner heads so that their smallest diameters are equal and adjacent to each other, separated only by the space formed by the spacer plates 31 to form a chamber for the valve disk 20. Outside each outer head 32 is the valve port block 28 (see Figs. 6, 7 and 10). It will be observed that the valve port block 28 has two passages 38, 39 ending, respectively, in register with the supply ports 35, 36 in the outer heads 32.

In order to remove any tendency to accumulate pressure where it is not required, I prefer to vent and relieve pressures in the plane of the valves. This is done around the valve driving shaft 24 (see Fig. 7). It will be noted that there is a shaft housing 40 surrounding the shaft 24. The housing 40 is spaced from the shaft 24 and sealed at its opposite ends by the gaskets 41, any pressure accumulating within the space between housing 40 and shaft 24 being vented through a pipe connecting with such space as clearly shown in Fig. 7.

I have found that accumulators properly placed can be of great value in obtaining proper operation of my hydraulic exciter—particularly when the exciter is being run at the higher frequencies. These accumulators, in effect, are gas or air pockets. I have found that it is impossible to design an hydraulic exciter with adequate frequency ranges unless the distance of travel of the pulsating liquid going to and from the cylinder can be brought to a minimum. The accumulators help to accelerate the liquid into and out of the cylinder, shorten the travel of the liquid pulsations and minimize pressure pulsations and surges in the piping. Thus if it were 100 feet from the pump to the exciter, one could not expect to accelerate 100 feet of oil within a time limit that was not far in excess of the time of travel of a shock wave through that pipe. I have found, however, that by placement of an accumulator adjacent to the high pressure port, the acceleration of that long mass of oil can be avoided. The oil is accelerated and decelerated only for a very short distance. Similarly, an accumulator immediately adjacent to the valving mechanism on the discharge side will absorb the spurts of oil and even out the flow back to the storage tank. In Figs. 4, 5 and 6, external accumulators are indicated by the reference characters 43, 44, at the intake and discharge sides, respectively. These accumulators are shown as straight piping attached to the cylinder just outside the valve ports. The piping is kept as short as possible because if it gets to a significant length relative to the frequency at which it is to operate, the tendency is to lose the advantage of the short hydraulic path.

It is also desirable to have compressible fluid such as air directly available to the inside of the cylinder. For this purpose I provide internal accumulators 45 which in Fig. 5 are shown as straight piping fastened to the cylinder near the top and bottom thereof. They are similar to but smaller than the external accumulators 43, 44. In Fig. 4 they are designated as variable volume internal accumulators. In Fig. 7 I have shown a somewhat different form of internal accumulator, namely, hollow rubber balls 50.

With further reference to Fig. 4, the high pressure tank can also have the function of an air pressure tank and can act as an additional accumulator to smooth out pulsations. The low pressure tank acts as a pump suction and surge chamber to provide the hydraulic volume required to maintain the system full of oil.

It will be seen that the accumulator system has a relation to the frequency range of the exciter. To change the frequency range, it is possible to switch the different accumulators in or out of service, thus changing the total accumulator volume or adjusting the volume of an accumulator. In Fig. 21 I have shown an adjustable volume accumulator. In this construction, the position of the piston 46 can be adjusted by adding or releasing gas through the gas valve 47.

In Fig. 4 I have indicated globe valves 74 adjacent the external accumulators 43, 44 to provide control of internal pressure and piston position.

It is sometimes desirable to make the piston self-centering. While valves could be provided at top and bottom of the cylinder to allow varying pressure and thus center the piston, I have found that because the weight on the piston is fixed and the pressure differential across the two valves changes with changes in flow of pressure from the source, adjustment may be needed for changing the hydraulic pressures. For this purpose, I provide a fifth port which discharges through a valve-controlled pipe 42, which pipe leads from the cylinder 13, it being noted that said fifth port is located at a midpoint of the cylinder and will therefore be cut off by the piston at midstroke (Figs. 5 and 6). Pipe 42 has a valve therein to adjust the discharge at this point and thus allow for centering the piston. When the piston rises to midpoint, it covers the said fifth port.

In Fig. 22 I have shown an automatic means for centering the drive piston. In this case, the main drive piston 65 is carried by a piston rod 66 which has a downward extension 67 passing into an auxiliary cylinder 68 located axially below the main or hydraulic cylinder. On this extension 67 in the auxiliary cylinder 68, is a servo-piston 69 of a length slightly in excess of the stroke of the main piston, and the auxiliary cylinder 68 is sufficiently large to enable the servo-piston 69 to make a full stroke. There is a pipe 70 connecting the top of the main cylinder to a port on the side of the auxiliary cylinder 68 and another pipe 71 connecting the lower end of the main cylinder to another port on the side of said auxiliary cylinder. These two ports, to which pipes 70 and 71 are connected are spaced apart so that they are both just covered when the servo-piston 69 is opposite them, said ports being at such a location vertically in the auxiliary cylinder 68 that when they are thus covered by the servo-piston 69 the main piston is centered in the main or hydraulic cylinder. This position, which can be termed neutral position, is made use of as follows:

On the opposite side of the auxiliary cylinder 68 from the pipes 70, 71 leading to the main cylinder, are ports from the high pressure supply line 72 of the main cylinder or some other pressure source. It will be seen by examination of Fig. 22 that while the pistons are in neutral position, the equal pressure from the auxiliary cylinder 68 is maintained unchanged, but that if the pistons are too high, the pressure will tend to push the main piston down, and if the pistons are too low, the pressure will tend to push the pistons up. In either case, the movement stops when the pistons arrive at the aforesaid neutral position. I prefer to put accumulators 73 at each end of the auxiliary cylinder 68, which accumulators communicate with the spaces within said cylinder above and below the piston 69. With this arrangement, the main piston 65 can be centered before rotation of the valve disk is started. In most cases, however, when using the hydraulic system, the piston 65 may be allowed to "float" over a wide range of positions to accommodate the particular application, and it will be found that it will operate satisfactorily. This floating may be controlled by a spring tending to maintain center or by using short springs near each end of the stroke. This floating is extremely useful in attaching fatigue test specimens or in other shake testing applications. I have found that the piston location does not appear to be critical in maintaining the sinusoidal force output.

If it is desired to produce a constant velocity unit having a wide frequency range, this can be closely simulated for the pneumatic unit by metering the flow through an orifice. This uses the principle of constant discharge through an orifice while the discharge pressure is fluctuating below 53% of the supply pressure.

If the exciter is desired to have a constant displacement, this can be simulated by driving the valve mechanism at a fixed ratio from a constant-volume hydraulic pump, with the hydraulic pump and valve mechanism driven by a variable speed motor. This type of pump has a fixed volumetric discharge per revolution and as such, forces the same volumetric discharge in the hydraulic exciter. This, basically, gives a constant stroke. However, an independent variable speed drive for the valve mechanism allows varying the frequency of operation independent of either volume or pressure.

Driving the valve mechanism strictly from the hydraulic pump, the ratios of speeds would be adjusted in order to adjust the stroke of the hydraulic exciter. In other words, rotating the hydraulic pump fast and the hydraulic exciter slowly would give maximum stroke, while running the pump slowly and the valve fast would give minimum stroke.

A constant acceleration unit or basically constant force over a relatively wide frequency range can be simulated by holding the supply pressure constant with the pressure regulating valve or a pressure regulating type of pump control.

In certain cases, an exciter is desired to carry a fixed gravity load on the table. This gravity load may be supported by a spring inside or outside the cylinder. In exciters where there is quite a long stroke, however, it may be more practical to use a higher pressure at the bottom of the cylinder to overcome the fixed gravity load. Such an arrangement would be accomplished by a low pressure source connected to the bottom end of the cylinder with a feather type check valve almost directly at the cylinder. This would take care of the non-operating condition of the exciter. If the flow in the machine is controlled by the mean position of the piston, this arrangement will work in both the operating and stationary or non-operating conditions. Where this is considered impractical, either the operating pressure between the two ends may be adjusted to take care of it or the port areas may be adjusted to maintain a mean position.

In the embodiments heretofore described, a pair of disks have been arranged at the ends of the cylinder. While I have shown the use of two disks as part of the valving means for my exciter, for most frequency ranges it will be found that the length of the hydraulic path is not critical enough to require two disks. For such non-critical uses, one disk can be employed at the side of the cylinder and connected to the two ends of the cylinder. Thus the piston will be driven by ports at both ends of the cylinder from one common valve disk. One example of such a construction is shown in Figs. 14 and 15. In this case there is a disk 59 mounted on and driven by an axis 60 which is normal to the axis of the piston 61. With this construction, only one disk instead of two has to be driven, with corresponding easing of tolerances, manufacturing and other cost considerations. As in the previous constructions, the valve system is at the cylinder. The valve disk may be off the center of the cylinder. In Figs. 14 and 15 during one-half of the travel of the disk, a disk hole is connected to pressure supply inlet port 62 and during the other half to the exhaust outlet port 63. There is a dividing rib or partition 64 separating the inlet side from the exhaust side, the partition 64 preferably being not more than the thickness of one disk hole diameter at the points where the disk holes pass under the partition. By proper arrangement of the holes in the disk 59 and the ports 107 and 109 in the cylinder, the upper half of the disk 59 provides for fluid inlet and discharge above the piston 61, and the bottom of said disk provides the proper inlet and discharge below the piston. To explain this more in detail, I have numbered each of the holes in the disk 59 with a different number. The disk 59 has eight holes numbered 51 to 58, inclusive, running in a counterclockwise direction beginning with the top hole in the disk at the right of the partition 64 as it appears in Fig. 15. Let us call the right of the partition the high pressure side and the left the low pressure side. There is a port in the cylinder going to the space below the piston 61 from the high pressure side and another one from the low pressure side. Similarly there is a port in the cylinder from the high pressure side of the system above the piston and another one from the low pressure side. In Fig. 15 these four ports 106 to 109, inclusive, are indicated by dotted x's, and where not in register with a hole in the disk, by a dotted circle. It will be seen that these four cylinder ports 106 to 109, inclusive, are each adjacent to the partition 64, although with other spacings of disk holes, etc. the partition and cylinder ports might be located elsewhere. Contrary to the constructions previously described, with the exception of this partition there is no special contact with the valve disk on the side opposite the cylinder. In other words, as they appear in Fig. 15, the holes 51, 58, 57 and 56 are in the common chamber called the high pressure chamber, and the holes 52, 53, 54, 55 lead to the common low pressure chamber in the position of the disk 59 shown in the this figure. With the disk 59 in this position, the high pressure is entering the cylinder below the piston 61 from hole 56 and the corresponding port at the right of the partition 64, while the liquid above the piston 61 is being exhausted through the disk hole 52 and the cylinder port adjacent the partition 64. After the disk 59 has turned 22½°, there will be motion of the piston 61 in the opposite direction. Accumulators can be used if desired.

The sequence of use of the inlet and discharge ports can be varied by changing the angular spacing of these ports. In Fig. 16 I have shown a construction in which there are two inlet ports 110, 111 and two discharge ports 112, 113 in each end of the cylinder 114 and corresponding openings in the outer head. Each of these four ports at each end is operated at a separate time from the others at its end, i. e. one inlet port, then one discharge port, then the other inlet port, followed by the other discharge port. The basic spacing between the two inlet ports is one hole every four diameters, and the same is true of the discharge ports. In other words, from the center of one hole to the center of the next it is four diameters, and the discharge ports are similarly spaced. This is different from the previous examples where the distance was three diameters. The holes in the valve disk are 30° from center to center, which is the equivalent of eight diameters. With this arrangement, and with the inlet and discharge ports spaced so that they come in register alternately, it will be found that first one inlet hole 110 will register with a disk hole 115. This is the position shown in Fig. 16. When that disk hole shuts off the inlet hole 110, the third disk hole 116 will start to open the first discharge hole 113. As soon as this is shut, the second disk hole 117 will start to open the other inlet port 111 and when that is finished the third disk hole 116 will start to open the second discharge hole 112. There are other variations of the spacing of the holes which can be used to give the proper alternation of registries which will maintain a correlation of angular span and hole diameter for the proper sequence of opening and closing an inlet followed by opening and closing of an outlet in continuous alternation.

Another embodiment to which my exciter is easily adapted is the double piston form shown in Figs. 19 and 20 where there is an ideal distribution of force over the table carrying the specimen. In the embodiments heretofore described, the ends of the cylinder were stationary head means forming two chambers of variable capacity in the cylinder. Whereas in those previously described constructions one piston and two stationary means are shown, in the construction of Figs. 19 and 20 there is a single stationary head means closing the center of the cylinder and a movable piston near each end of the cylinder and at opposite sides of said stationary head. The partition or center head is identified in the drawings by the reference character 75, the work table or upper piston by the reference numeral 76, and the piston at the bottom by the numeral 77. This construction definitely gives the advantage of having uniform hydraulic pressure in back of the cylinder head to cause almost exact uniform loading across the surface. Upper piston 76 is connected to the lower or bottom piston 77 by tie rods 79 distributed around the back of the pistons and passing through the center head 75. These tie rods 79 are preferably placed directly opposite hold-down bolts 81 passing through the end of each piston from the outer face to the inner face thereof and into the threaded end of the tie rod abutting said inner face. Bearing sleeves 82 are used to engage the tie rods where they pass through the center head 75. When pressure is applied between the head 75 and the upper piston 76, there is uniform force exerted across the head of the piston for uniform loading with minimum deflection. When the movement is reversed and the pressure is applied between the center head 75 and the lower piston 77, the pressure applied to the lower piston 77 is transmitted evenly and directly to the upper piston 76 and thence to the specimen on this table so that said upper piston is pulled by said lower piston with minimum deflection.

As in the case of the construction shown in Figs. 14 and 15, the valving of this exciter of Figs. 19 and 20 is obtained from a single disk 78 driven by a shaft 85 which extends in a direction normal to the direction of movement of the pistons 76 and 77. However, there is a difference in the porting which might be noted as showing the versatility of my valve system. One should first note that four supply ports are shown coming from the outside, the inlet or high pressure ports being indicated by the reference character 83 and the discharge or low pressure ports by the numeral 84 located nearer the center head or partition 75. The disk 78 is built into the side wall of the cylinder and revolves about the axis of the shaft 85 located in the center head on a line somewhere near the edge of the pistons 76 and 77. It will be seen that the disk 78 is completely enclosed by a stationary outside wall 86 through which the above-referred to four supply ports pass, and that said supply ports register with corresponding cylinder ports 87, 88.

In Fig. 19 it will be seen that the inlet ports 83, 87 are located at a larger radius from the center of rotation of the disk 78 than are the discharge ports 84, 88. This arrangement of ports is such that the inlet and discharge ports are in a straight line coinciding with the center of the cylinder but they could be located in some other manner if desired. When thus located in a straight line along the median line of the cylinder, I provide two holes at each hole location in the disk 78, each two holes being on the face of the disk near the periphery thereof and on the same radial line from the center of the disk. It will be seen that when an inlet port is reached, the outer hole in the disk 78 will register with the port 87 whereas the discharge port 88 will register in turn with a hole in said disk 78 which is nearer the center of said disk.

When it is desired to operate the machine at higher frequencies while maintaining a constant acceleration of the test table, I have found that it is necessary to reduce the angular rotation of the valve disk per stroke of the exciter. To this end, I materially reduce the diameter of the disk holes. To keep up the capacity of the valve ports with these higher frequencies, I provide double holes on the disks. As shown in Fig. 23, I provide two small holes in the face of a disk 80 near the periphery thereof, which holes are in radial alinement. The holes just referred to are designated by the number 89.

The function of these holes and ports can be considered as a means of metering the oil. At the same time, however, I also recognize that it is necessary to reduce the hydraulic path of the high speed oil to a minimum. I have also found that the smaller the diameter of the holes in the disk or in the inner head of the cylinder, the less thickness is required in the disk or in the inner head. I therefore make the embodiment of Figs. 23 and 24 as follows:

In addition to the two small holes designated by the number 89 in the disk 80, I provide inlet ports 90 and similar discharge ports 91 in the inner head 92 of the cylinder. However, as can be seen in Fig. 24, the two small holes 91 in the inner head 92 are merged into one larger hole 93 about 3/16" from the lower face of disk 80. It will therefore be seen that the holes in the disk 80 and the ports in the inner head 92 are used to meter the oil and that inlet and discharge to the cylinder occur only when there is registry between the disk holes and the inner head ports. It is therefore possible to maintain the full area of the inlet and discharge pressure ports in the outer head 94 right down to the upper face of the disk 80. These, therefore, can be considered, respectively, as an inlet area open to pump pressure and a discharge area beginning right at the disk and connected to discharge pressure control. The inner and outer heads 92, 94 can be kept in register on the cylinder by registry pins 97.

These intake and discharge areas over a multiplicity of holes are taken further advantage of in the modification of Figs. 25–28. The angular spacing of the inlet ports 90 or the discharge ports 91 in the inner head 92 is unchanged angularly from the arrangement shown in Figs. 23 and 24. In that example, the holes in the valve disk 80 are 12° apart. However, intake and discharge ports in the inner head require a 6° angular shift between intake and discharge so that 6° of angular motion of the valve disk 80 changes from an opening of the inlet ports to an opening of the discharge ports. It will be seen that after this 6° difference has been set, the holes can be 12, 24 or 36° apart. Correspondingly, the spacing between the inlet and discharge ports in the inner head 92 can be 6, 18, 30 or 42° apart. Whereas in the disk 80 the holes are shown repeated at 12° intervals all around the disk, in the outer head 94 the ports constitute only a single inlet area 95 and one discharge area 96, and in the inner head 92 one pair of inlet holes 90 and one pair of discharge holes 91. Fig. 24 is a vertical view in section of the plan view of Fig. 23, taken on a median line 24—24 jogged to show the discharge ports 91. In Fig. 23 the outer head of the cylinder is broken away to show a part of the valve disk 80.

If for any reason still more port capacity is desired, the multiple arrangement of Figs. 25–28 can be employed. The construction shown in these figures is a modification of the construction of Figs. 23 and 24 in which the number of holes and ports used simultaneously in the disk and in the cylinder is doubled, maintaining the uniform spacing heretofore used. The result of this doubling is as follows: With the holes in the disk 80 12° apart and ports in the cylinder 18° apart, the hole diameter being approximately 3°, all of which is the same as in Figs. 23 and 24, I am able to double the number of holes used at any given moment merely by enlarging the size of the inlet ports 95 in the outer head, 94, which ports are open to pump pressure and the size of the discharge ports 96. In Figs. 25 through 28 I have shown an embodiment of my present invention in which four inlet holes are operated simultaneously and four discharge holes, in their turn, are operated simultaneously. The sequence of hole registry is shown in Figs. 26, 27 and 28, where a shaded hole represents registry between a port in the inner head 100 and a hole in the disk 80. The letter "I" stands for "Inlet," and the letter "D" for "Discharge." There are four holes open to inlet pump pressure in the inlet area 98, and when the disk holes match with those four inlet holes, the discharge ports in the inner head 100 are midway between the disk 80 holes, as shown in Fig. 26. When the disk moves ahead the diameter of one hole, all the disk holes are out of register with all the holes in the inner head 100. This is the condition shown in Fig. 27. When the disk 80 moves ahead the diameter of another hole, the situation is as shown in Fig. 28. The discharge ports in the inner head 100 are in register with disk holes, but the inlet ports are not. Thus by affording pressure ports 98, 99 in the outer head to furnish inlet and discharge areas connecting with four holes in the disk 80 and inner head, it will be seen that the port capacity has been tremendously increased. With a machine having four small holes operating simultaneously in this manner, the available frequency of the machine can be increased roughly four times. Six or more disk holes can be employed if desired. Also, a multiple valve arrangement can be provided. In this case, some of the valves used can be opened up or shut down to expand the frequency range of a given exciter.

When an exciter built in accordance with this invention is used as a pneumatic exciter, because the discharge through an orifice is not affected by the discharge pressure as long as the discharge pressure is less than 53% of the supply pressure, piston velocity can be kept substantially constant over a wide frequency range without readjustment or changing of ports or some other basic consideration.

Another interesting observation is that with a given size of accumulator the acceleration wave will improve as the frequency increases. Increasing frequency at constant velocity increases the acceleration and force required. Therefore increasing pressure can be provided if significant-sized accumulators are used.

In Figs. 17 and 18, the use of a multiplicity of exciters driving a single large table is illustrated. These views also illustrate the possibility of spacing these exciters around a pair of common valve disks. The construction shown in these figures, then, consists of a large test table 101, say 40" in diameter, which is intended to take a very heavy load. In order to give a good force distribution over the area of this table, a series of double disk exciters 102, such for example as that shown in Figs. 4-11, are assembled in a circle underneath the table. It is very simple to keep all these cylinders in phase and in time with each other by providing a large single pair of disks 103 centrally mounted for rotation about an axis which is located in the cylinder circle, and by driving the disks from a single variable speed motor. In Fig. 18 it will be noticed that one disk hole in the orbit of each exciter cylinder is shown by a heavy solid line while the others are shown dotted. This heavy solid line showing is intended to suggest that the disk holes come in register with the supply and cylinder ports for the pressure side simultaneously in all the cylinders and that by the same token, the holes will register with the discharge ports simultaneously. The bottom disk, of course, is phased to work oppositely to the upper disk, and it will therefore be seen that there is no chance of different cylinders getting out of time at the two ends or with each other so that the table 101 will be operated uniformly. An enormous force potential can be obtained by means of my exciter, very much greater than that known with electromagnetic exciters.

It has been found that the sinusoidal form of movement can be maintained in my exciters over a wide range. If basic adjustments such as accumulator size, valve sizes, etc. are changed, the machine can be operated over an extremely wide frequency range.

The cost of manufacture of my unit is less than for an equivalent electromechanical unit. The unit lends itself well to fatigue testing work where it is not necessary that the unit be operated at resonance to get high force. With fatigue testing, the machine can be designed to work without any resonant build-up.

In Figs. 12 and 13, pneumatic any hydraulic examples of the operation of the machine are given. With the air device and a frequency of 24 cycles per second, an inlet pressure of 100 lbs. per square inch and a discharge pressure of 40 lbs. per square inch, acceleration of .95 g. and a sine wave such as shown in Fig. 12, are obtained. For an example of the operation of an embodiment of my machine on an hydraulic principle, an inlet pressure of 380 lbs. per square inch and a discharge pressure of 280 lbs. per square inch with an acceleration of 3.0 g. are given. This operated with a frequency of 340 cycles per second and gave a smooth curve such as shown in Fig. 13. These curves and figures were obtained without using the high frequency valving setup of Figs. 23-28.

It will be noted that my machine is an extremely simple vibration exciter having a minimum number of moving parts and that in the case of the hydraulic exciter, these parts are amply lubricated. They also have a very short path for the driving fluid. In has been found that having the valving adjacent the cylinder gives a higher rate of frequency than otherwise obtainable. It will be noted, for example, that it is possible to have the effective length of the fluid path somewhat equivalent to one-half of the valve port size of pipe used. The machine has an extremely simple valving arrangement providing a very close approach to a sine wave opening of the ports (area plotted against time) and gives the much desired independent control of frequency and force. Pressure surgings through the piping are minimized, and when operated hydraulically, the piston position can be allowed to float over a wide range to accommodate a particular application and will operate satisfactorily in that position. The machine is well adapted for proper distribution of the load, as shown in Figs. 17 and 18, or for an ideal distribution of the force over the specimen table area, as shown in Figs. 19-20. Importantly, it provides an extremely high force unit adaptable at relatively high frequencies in the vibration exciter field. The rotary valve disk is intended to turn through the complete 360° and keep on turning in the same direction at uniform speed. Its turning in a single direction at uniform velocity while providing a sinusoidal alternation and position of the piston and table is much simpler than reversing the stroke. When incorporated with the cylinder in the manner shown, adjacent the working portion of the cylinder, it will be seen that the vibration possibilities of an hydraulic exciter have been tremendously increased. These possibilities are particularly striking when one considers the tremendous increase in the frequencies which my exciter can produce and their sinusoidal character. This, taken in connection with the ability of hydraulic systems to handle force potentials up to say half a million pounds generation, where exciters of these proportions have heretofore not been known, shows the value of the construction hereinabove described.

What is claimed is:

1. A fluid-operated vibration test exciter comprising a cylinder, piston means and stationary head means jointly forming with the piston means two chambers of variable capacity in the cylinder, rod means rigidly attached to the piston means and lying longitudinally in the cylinder, there being inlet and discharge ports in the cylinder in each of the chambers and rotary disk means in direct contact with the cylinder having holes therein adapted to act as valve ports for said inlet and discharge ports in continuous succession; whereby displacement of the piston in sinusoidal motion is obtained.

2. A fluid-operated vibration test exciter according to claim 1 in which the fluid supply and return means is a closed high and low pressure system whose inlet and discharge ports are built into each end of the cylinder in register with the cylinder ports, and disk means located between the supply means and the cylinder; the pressure system supplying high and low fluid pressure respectively to the inlet and discharge cylinder ports through the disk; whereby the frequency of reciprocation is controlled by the rate of rotation of the disk means and the force applied to the piston is independently adjusted by the inlet and discharge pressure ratio.

3. A fluid-operated vibration test exciter comprising a test table to which the specimen to be tested can be attached, a piston to move the table and a cylinder for the piston providing space on each side of the piston permitting it to reciprocate axially, there being inlet and discharge ports in the cylinder on each side of the piston and a closed fluid supply and return system having similar ports in register with the cylinder ports, in combination with disk means in direct contact with the cylinder and fluid system ports having valve holes therein, the disk holes and cylinder and system ports being so spaced that upon rotation of the disk in one direction the holes register in continuous succession with the cylinder inlet and discharge ports; whereby the frequency of reciprocation of the piston is controlled by the rate of rotation of the disk and rapid sinusoidal reciprocation is obtained.

4. A hydraulic-operated vibration test exciter comprising a test table to which the specimen to be tested can be attached, a piston to move the table and a cylinder for the piston providing space on each side of the piston permitting it to reciprocate axially, there being inlet and discharge ports in the cylinder on each side of the piston and a closed fluid supply and return system having similar ports in register with the cylinder ports, in combination with perforated sheet material in direct contact with the cylinder and fluid system ports having valve holes therein, the holes in the sheet material and cylinder and system ports being so spaced that upon movement of the sheet material in one direction the holes register in continuous succession with the cylinder inlet and discharge ports; whereby the frequency of reciprocation of the piston is controlled by the rate of movement of the sheet material and rapid sinusoidal reciprocation is obtained.

5. A fluid-operated vibration test exciter according to claim 3 in which there are two disks in the disk means, one closely associated with each end of the cylinder, and there is a common driving means for the two disks, the disks rotating uniformly in one direction in planes parallel to the plane of the piston head and phased to opposite points in the fluid inlet and discharge cycle.

6. A fluid-operated vibration test exciter according to claim 1 in which there is an adjustable passage between the two ends of the cylinder consisting of an orifice through the piston to assist in developing sinusoidal motion of the piston.

7. A hydraulic vibration test exciter comprising a piston, piston rod means therefor and a closed cylinder in which the piston is adapted to reciprocate, there being an inlet port and a discharge port in the cylinder on each side of the piston, and high and low pressure fluid means including ports in register with the inlet and discharge cylinder ports, a disk means located between the cylinder ports and the fluid ports having circumferentially spaced holes therein to register and in direct contact with the ports, all the openings being of approximately the same area, and means to rotate the disk means, in combination with accumulators in the pressure means adjacent the valve ports; whereby the liquid is delivered rapidly to and from the cylinder, high frequency reciprocation of the piston is obtained and pressure surges are avoided.

8. A hydraulic vibration test exciter according to claim 7 in which there is an accumulator immediately adjacent the high pressure port at each end of the cylinder and an air accumulator on each side of the piston effective between the valve port and the piston.

9. A hydraulic exciter according to claim 7 in which there are at least two each circumferentially spaced inlet and discharge cylinder ports in the cylinder and at least two each supply ports connected together into areas in register therewith on the opposite side of each disk; whereby the port capacity of the exciter is increased.

10. A hydraulic vibration test exciter comprising a test table to which the specimen to be tested can be attached, a piston to move the table, a closed cylinder in which the piston is adapted to reciprocate to cause the vibrations, there being an inlet and a discharge port in the cylinder on each side of the piston, a liquid supply and return system having inlet and discharge ports built into the cylinder in register with the cylinder ports, in combination with two disks having curvilinear holes at circumferentially equally spaced positions adapted to pass between the cylinder and supply ports and to meter inlet or discharge of liquid in an alternating continuous manner to develop sinusoidal acceleration piston motion, and unitary means rotating the disks at the same speed but in opposite phase relation to the inlet and discharge ports at the two cylinder ends.

11. A hydraulic test exciter in which there are a plurality of pistons and cylinders according to claim 10, in combination with a single test table under which the pistons and cylinders are distributed and a single pair of disks, one disk passing between the supply ports and cylinder ports of the upper ends of all the cylinders, and the other disk similarly controlling the lower ends of said cylinders; whereby a large controlled force is obtained distributed over a large area.

12. A hydraulic exciter according to claim 10 in which there are multiplicity of holes in the disks at each circumferentially spaced position, the holes at each such position being radially in line in the disks; whereby the angular rotation of the valve disks necessary to produce a reciprocation is reduced compared to one large port of the same total port capacity, and the frequency of reciprocation is increased for the same angular movement of the disk.

13. A hydraulic test exciter comprising a piston, a closed cylinder in which the piston is adapted to reciprocate, there being an inlet and a discharge port in the cylinder on each side of the piston, and a liquid supply system having a chamber in the wall of the cylinder, including inlet and discharge means built into the cylinder in register with the cylinder ports, a single disk having spaced holes adapted to pass between the cylinder and supply system ports in direct contact therewith and to meter inlet and discharge of liquid, said disk turning on an axis at right angles to the direction of movement of the piston, and a partition dividing the chamber into inlet and discharge chambers with the cylinder ports registering therewith through the disk.

14. A pneumatic vibration test exciter comprising a piston, rod means therefor, and a closed cylinder in which the piston is adapted to reciprocate, there being an inlet port and a discharge port in the cylinder on each side of the piston, and high and low pressure fluid supplies connected to ports in register with the cylinder inlet and discharge ports, the low pressure supply being not more than 53% of the high pressure, in combination with disk means located between the supply and cylinder ports having holes of the same size as the ports adapted to register therewith, and means to rotate the disk means; whereby the velocity of the piston can be kept substantially constant within a wide frequency range.

15. A fluid-operated vibration test exciter comprising a cylinder, piston means and stationary head means jointly forming with the piston means two chambers of variable capacity in the cylinder, rod means rigidly attached to the piston means and lying longitudinally in the cylinder, there being inlet and discharge ports in the cylinder in each of the chambers and rotary disk means in direct contact with the cylinder having holes therein adapted to act as valve ports for said inlet and discharge ports, in combination with a fluid accumulator associated with each of the chambers in the cylinder and means to rotate the disk means, whereby high frequency displacement of the piston for sinusoidal motion is obtained.

16. A fluid-operated vibration test exciter comprising a cylinder, piston means and stationary head means jointly forming with the piston means two chambers of variable capacity in the cylinder, rod means rigidly attached to the piston means and lying longitudinally in the cylinder, there being inlet and discharge ports in the cylinder in each of the chambers and rotary disk means in direct contact with the cylinder having holes therein adapted to act as valve ports for said inlet and discharge ports, in combination with an accumulator means adjacent the inlet port for each of the two chambers, whereby high frequency displacement of the piston for sinusoidal motion is obtained.

References Cited in the file of this patent

UNITED STATES PATENTS

| 1,116,747 | Sklovsky | Nov. 10, 1914 |
| 2,079,041 | Ryan et al. | May 4, 1937 |

FOREIGN PATENTS

| 575,917 | Great Britain | Mar. 11, 1946 |